United States Patent
Moon et al.

(10) Patent No.: US 7,669,228 B2
(45) Date of Patent: Feb. 23, 2010

(54) SYSTEM AND METHOD FOR CHANGING NETWORK BEHAVIOR BASED ON PRESENCE INFORMATION

(75) Inventors: Billy G. Moon, Morrisville, NC (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 812 days.

(21) Appl. No.: 11/319,332

(22) Filed: Dec. 27, 2005

(65) Prior Publication Data

US 2007/0150938 A1    Jun. 28, 2007

(51) Int. Cl.
G06F 21/06    (2006.01)
H04L 29/06    (2006.01)
G08B 9/02    (2006.01)

(52) U.S. Cl. ............................ 726/1; 726/2; 340/539.23

(58) Field of Classification Search .................. None
See application file for complete search history.

(56) References Cited

U.S. PATENT DOCUMENTS

| | | | | |
|---|---|---|---|---|
| 5,670,940 | A * | 9/1997 | Holcomb et al. | 340/543 |
| 5,796,942 | A | 8/1998 | Esbensen | 395/187.01 |
| 6,182,223 | B1 * | 1/2001 | Rawson | 726/22 |
| 6,282,655 | B1 * | 8/2001 | Given | 726/34 |
| 6,374,145 | B1 * | 4/2002 | Lignoul | 700/17 |
| 6,560,711 | B1 * | 5/2003 | Given et al. | 726/34 |
| 6,856,687 | B2 | 2/2005 | DiSanto et al. | 380/243 |
| 7,246,371 | B2 * | 7/2007 | Diacakis et al. | 726/2 |
| 7,478,418 | B2 * | 1/2009 | Supramaniam et al. | 726/1 |
| 2002/0103878 | A1 | 8/2002 | Moncibais | 709/217 |
| 2002/0104006 | A1 | 8/2002 | Boate et al. | 713/186 |
| 2003/0182435 | A1 | 9/2003 | Redlich et al. | 709/229 |
| 2006/0267780 | A1 * | 11/2006 | Adams | 340/573.1 |
| 2007/0103328 | A1 * | 5/2007 | Lakshmanan et al. | 340/686.6 |

OTHER PUBLICATIONS

McAfee, Inc., "McAfee Protection-in-Depth Strategy," http://www.mcafeesecurity.com/us/ products/home.htm, 4 pages, 2005.
J. Peterson, "Common Profile for Presence (CPP))," Network Working Group, RFC 3859, http://www.faqs.org/rfcs/rfc3859.html, 12 pages.
P. Rodrigues and E. Gauthier, Strategies for Automating Network Policy Enforcement—(DRAFT 02), http://security.internet2.edu/netauth/docs/draft-internet2-salsa-netauth-summary, 18 pages.

* cited by examiner

*Primary Examiner*—Christopher A Revak
(74) *Attorney, Agent, or Firm*—Baker Botts L.L.P.

(57) ABSTRACT

A system and method for changing network behavior based on presence information includes detecting one or more presence indicators. The one or more presence indicators indicate presence information. An electronic persistent presence (EPP) is formed based on the one or more presence indicators. It is determined whether to change the network behavior from a first user policy to a second user policy according to the EPP. The second user policy associated with the EPP is implemented according to a determination that the network behavior is to be changed.

23 Claims, 1 Drawing Sheet

SYSTEM AND METHOD FOR CHANGING NETWORK BEHAVIOR BASED ON PRESENCE INFORMATION

TECHNICAL FIELD OF THE INVENTION

This invention relates generally to the field of communications and more specifically to a system and method for changing network behavior based on presence information.

BACKGROUND

System users interact and communicate using various types of network devices such as desktop computers, laptop computers, personal digital assistants, desktop phones, cell phones, and other devices. Systems and methods have been developed to determine whether certain system users are connected to a network and available for communication through one or more of those network devices. While on the network, the system users communicate according to particular user policies that define access rules. The policy of the user may remain static or be manually changed. Conventionally, the policy changes are made through manual configuration by an administrator.

SUMMARY OF THE DISCLOSURE

From the foregoing, it may be appreciated by those skilled in the art that a need has arisen for an improved technique for changing network behavior. In accordance with the present invention, a system and method for changing network behavior based on presence information are provided that substantially eliminate or greatly reduce disadvantages and problems associated with conventional systems and methods for changing network behavior.

According to one embodiment of the present invention, a system and method for changing network behavior based on presence information includes detecting one or more presence indicators. The one or more presence indicators indicate presence information. An electronic persistent presence (EPP) is formed based on the one or more presence indicators. It is determined whether to change the network behavior from a first user policy to a second user policy according to the EPP. The second user policy associated with the EPP is implemented according to a determination that the network behavior is to be changed.

Certain embodiments of the invention may provide one or more technical advantages. A technical advantage of one embodiment includes changing the network behavior dynamically. For example, the network behavior changes according to the presence of a user. Therefore, the network behavior for a user does not remain static until an administrator manually changes the user's policy, but the user's policy may change as the presence of the user changes. Therefore, the policy of a user can be affected according to the presence of the user. Another technical advantage of another embodiment includes enhancing security by dynamically changing the policy of the user. For example, if a user logs onto the network with a particular policy and leaves the endpoint, another user may access the network with the initial user's policy. Therefore, the security of the network may be at risk. Dynamically changing the policy for the user according to presence information allows the security of the network to be maintained without manual intervention. Another technical advantage of yet another embodiment includes collecting information to affect the policy change that may not be available in a conventional client/server environment. For example, information about a user's phone on a network and information about a portable communications device on the network is available in a network environment, not in a conventional client/server environment.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, wherein like reference numerals represent like parts, in which.

DETAILED DESCRIPTION OF THE DRAWINGS

Figure 1:
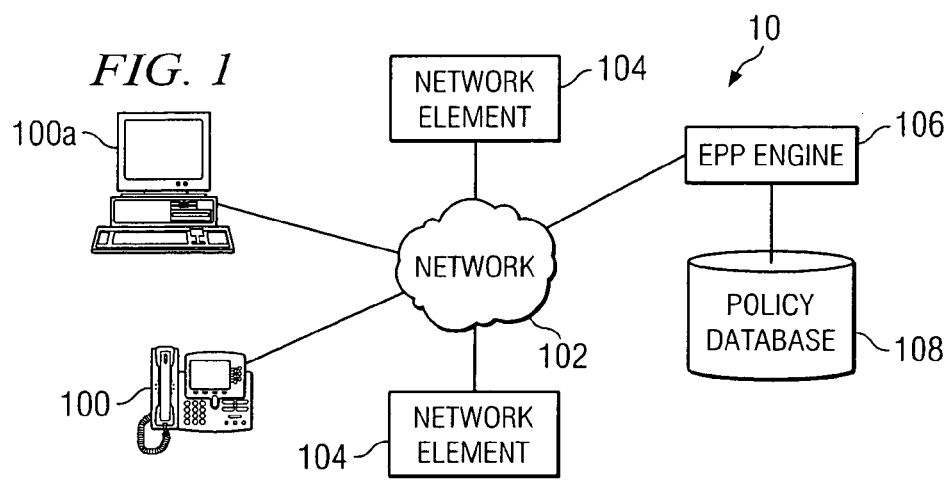
FIG. 1 illustrates an embodiment of a system that provides for changing network behavior.

FIG. 1 illustrates an embodiment of a system 10 that provides for changing network behavior. System 10 includes endpoints 100, network elements 104, and an EPP engine 106 that communicate through a network 102. EPP engine 106 detects presence indicators of endpoints 100 and forms an EPP based on the presence indicators to change the network behavior of endpoints 100. The network behavior of endpoints 100 is characterized by a user's policy. Accordingly, components of system 10, such as network elements 104, use the EPP to implement the change of the user's policy, which results in a change in the network behavior.

Endpoints 100 represent any suitable device operable to communicate with network 102. System 10 determines presence information of endpoints 100, a user using endpoint 100, or any suitable host or node operable to provide presence information within system 10. Presence information may include any suitable information that describes the location of the relevant user, the availability of that user, the reachability of the user, and/or preferred modes of communication for the user for the purposes of communicating with other users. Examples of presence information include, but are not limited to, information indicating whether a user is currently logged into a particular network, endpoint, or component, information identifying a wireless network in which the user is currently located, information indicating whether the user has used a particular component of network 10 within a predetermined time period, information identifying an activity presently scheduled for the user, and information specifying a physical location of the user. System 10 determines the presence information by detecting presence indicators. Presence indicators provide information about the activity of a user, endpoint 100, a node, a host, or any suitable device. Endpoint 100 and/or the user generate the presence indicator. For example, endpoint 100 generates a presence indicator when a user logs into network 102. A presence indicator may also be generated if there is no keyboard activity for a period of time. As another example, a user generates a presence indicator when an accelerometer in a personal communications' device detects the user's motion. Additional presence indicators include, but are not limited to, detecting the location of the user through a radio frequency identification tag, detecting the user logging into network 102 on another endpoint 100, and detecting a user not answering a communication on endpoint 100.

Endpoints 100 exchange audio, voice, data, video, or other information in system 10. To control the exchange of the information, endpoints 100 send signaling or any suitable control requests within system 10. Furthermore, the requests may be in any suitable communication protocol. Endpoints 100 may be any combination of hardware and/or software that provide communication services to a user. Endpoints 100 may include analog, digital, or Internet Protocol (IP) telephones, a cellular phone, a wireless fidelity (Wi-Fi) phone, a personal computer such as a laptop or a desktop, a personal computer running a telephony application, a personal digital assistant, or any suitable device operable to communicate with system 10.

Network 102 allows elements within system 10 to communicate with each other. Network 102 may include a public switched telephone network (PSTN), a local area network (LAN), a wide area network (WAN), any other public or private data network, a local, regional, or global communication network such as the Internet, an enterprise intranet, other suitable wireline or wireless communication link, or any combination of the preceding. Network 102 may include any combination of network elements 104, such as gateways, routers, hubs, switches, access points, base stations, and any other hardware and/or software that may implement any suitable protocol or communication. Network elements 104 provide switching and network transport functions within network 102 for endpoints 100. In an embodiment, network elements 104 implement a new user policy based on the EPP formed by the presence indicators. The policy defines the access a user has to network 102 using endpoint 100 at a particular point in time.

EPP engine 106 detects presence indicators of endpoint 100, organizes the presence indicators, and forms an EPP according to the presence indicators. In an embodiment, EPP engine 106 organizes the presence indicators by integrating and weighting the presence indicators. For example, EPP engine 106 determines which presence indicators are more important and places more weight on that indicator. EPP engine 106 forms the EPP from the presence indicators, and the EPP is used to determine whether to change network behavior by changing the user's policy. The EPP represents the status of endpoint 100 and/or the user based on the detected presence indicators. The EPP may be in any suitable form or protocol that provides status information.

EPP engine 106 includes any suitable arrangement of components operable to perform the operations of EPP engine 106, and may comprise logic, an interface, memory, other components, or any suitable combination of the preceding. For example, EPP engine 106 includes a module that facilitates the detection of presence indicators and the integration and weighting of the presence indicators. Within system 10, EPP engine 106 may be a separate element or may be included within another element. For example, network element 104 that endpoint 100 first attaches to may include the functionality of EPP engine 106.

Policy database 108 stores and facilitates the retrieval of user policies. The EPP that EPP engine 106 forms is the key in determining which user policy in policy database 108 to apply. For example, when EPP engine 106 forms an EPP and it is determined that a user's policy should be changed based on the EPP, the new user policy is retrieved from policy database 108. In an embodiment, each EPP of a user may have an associated user policy stored in policy database 108. Therefore, when an EPP is formed according to the presence indicators, the user policy is already associated with the EPP. In this embodiment, a user has multiple policies that can be implemented based on the status of the user as indicated by the EPP. Policy database 108 may be any suitable type of database that organizes information in any suitable manner to provide for quick retrieval.

A new user policy that is imposed may include, but is not limited to, limiting the rate of traffic to and from endpoint 100, triggering alarms if unexpected traffic types emerge from endpoint 100, or limiting a user's access to network 102. Furthermore, the user policy can be implemented on both directions of traffic flow.

In an example embodiment of operation, a user logs onto network 102 via endpoint 100a. The user is granted a specific service level agreement (SLA), or policy, which defines the service provided to the user. A user's profile is assessed to determine the network access of the user. For example, a user may have more or less capacity on network 102, access to more or less information, or access to specific networks for a different quality of service or a different user experience depending on the user's profile and the SLA. In this example, the user leaves endpoint 100a, but remains logged into network 102. As time passes with the user away from endpoint 100a, presence indicators begin to trigger and EPP engine 106 detects the presence indicators. EPP engine 106 integrates the detected presence indicators, weights the integrated presence indicators, and forms an EPP for the user. The EPP is made available to network element 104 near endpoint 100a. Using the EPP, a new user policy within policy database 108 is selected and applied. Network element 104 imposes the new user policy as a result of the user no longer being at endpoint 100a.

In addition to a particular user's policy being changed by its own presence information, EPP engine 106 may also generate an EPP for other users in response to presence information associated with the particular user. Similarly, the particular user's policy may be changed based on presence information of other users in network 102. For example, one or more presence indicators may be triggered in response to presence information associated with the particular user. EPP engine 106 may form a new EPP for the particular user as well as a new EPP for one or more other users in response thereof. Based on the adjusted EPP for each user, a policy for each user is established. The policy established for each user may be the same policy as was previously established prior to formation of a new EPP or a different policy as determined by the new EPP. In this manner, if it is determined that the particular user is away from an endpoint 100, items including access to network 102, bandwidth allocated to the particular user, or quality of service associated with the particular user may be reduced. In response to this change in the particular user's policy, other users may be given increased access, bandwidth, or quality of service according to their new EPP information.

Modifications, additions, or omissions may be made to system 10. For example, system 10 may include any suitable number of endpoints 100, network elements 104, or other components that provide for changing the network policy according to presence information.

Figure 2:
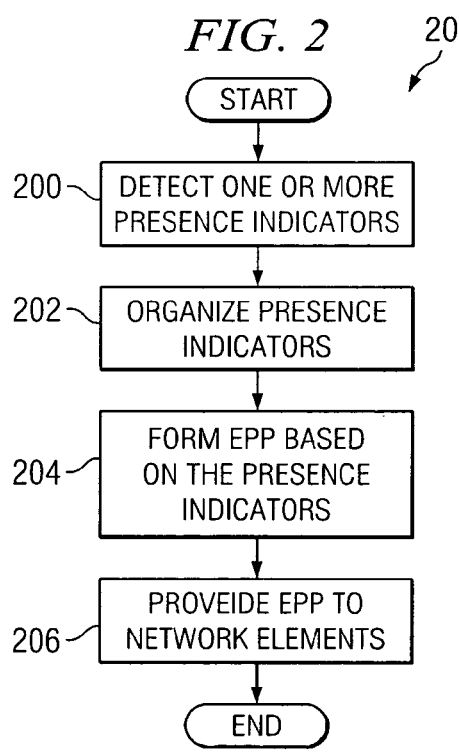
FIG. 2 is a flowchart illustrating an embodiment of forming an electronic persistent presence (EPP) to effectuate the change in network behavior.

FIG. 2 is a flowchart 20 illustrating an embodiment of forming an EPP to effectuate the change in network behavior. The method may be used by any suitable system, such as system 10 of FIG. 1.

The method begins at step 200 when one or more presence indicators are detected. For example, EPP engine 106 detects the presence indicators that endpoint 100 and/or the user generate. At step 202, EPP engine 106 organizes the detected presence indicators. In organizing the presence indicators, EPP engine 106 may integrate and weight the presence indicators.

At step 204, EPP engine 106 forms an EPP based on the presence indicators. The EPP represents the status of endpoint 100 and/or the user, and allows for a determination to be made whether to change the network behavior for the user. EPP engine 106 provides the EPP to network elements 104 at step 206.

Modifications, additions, or omissions may be made to flowchart 20. For example, in organizing presence indicators, EPP engine 106 may correlate the presence indicators. As another example, EPP engine 106 may provide the EPP to other suitable components in addition to network elements 104, such as policy database 108 for storage, or to endpoint 100. The method may include more, fewer, or other steps. Additionally, steps may be performed in any suitable order.

Figure 3:
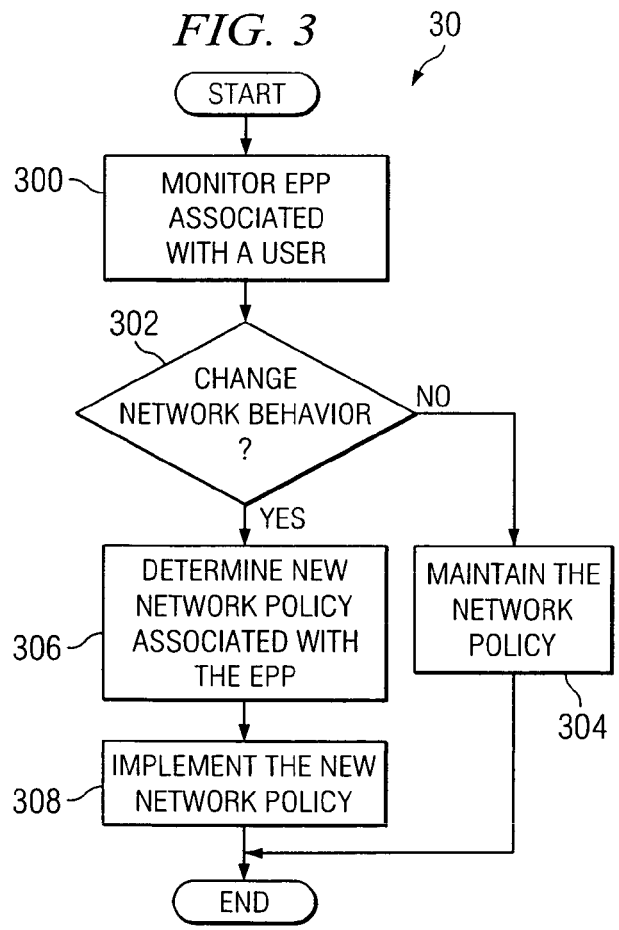
FIG. 3 is a flowchart illustrating an embodiment of implementing the change in network behavior.

FIG. 3 is a flowchart 30 illustrating an embodiment of implementing the change in network behavior. The method may be used by any suitable system, such as system 10 of FIG. 1.

The method begins by monitoring the EPP associated with a user at step 300. A determination is made at step 302 as to changing the network behavior. The network behavior may be changed for any suitable reason. For example, if the EPP associated with a user changes, if the user is not near endpoint 100, or if the location of the user changes, it may be determined that the network behavior should be changed.

If it is determined not to change the network behavior, the user policy is maintained for the user at step 304. However, if it is determined to change the network behavior, the new user policy associated with the EPP is determined at step 306. For example, endpoint 100 or network element 104 retrieves the new user policy associated with the EPP from policy database 108. The new user policy is implemented at step 308.

Modifications, additions, or omissions may be made to the method. For example, network element 104 or endpoint 100 may execute the steps included in flowchart 30. As another example, changing a single user's policy may result in the change of one or more other user's policies. For example, a user uses a certain amount of bandwidth. The user's policy is changed to decrease the amount of bandwidth, and the bandwidth of the other users increases as a result of the additional bandwidth available. The method may include more, fewer, or other steps. Additionally, steps may be performed in any suitable order and by any suitable component in system 10.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the scope and spirit of this disclosure.

What is claimed is:

1. A method for changing network behavior according to presence information, the method comprising:
   detecting, by a processing device, one or more presence indicators associated with a first user in a network, wherein the one or more presence indicators indicate presence information;
   forming, by the processing device, an electronic persistent presence (EPP) for the first user based on the one or more presence indicators;
   forming, by the processing device, an EPP for other users in the network based on the one or more presence indicators associated with the first user;
   determining, by the processing device, whether to change the network behavior of any user in the network from a current user policy to a new user policy according to the EPP;
   initiating implementation, by the processing device, of the new user policy associated with the EPP according to a determination that the network behavior is to be changed.

2. The method of claim 1, further comprising:
   receiving, by the processing device, the one or more presence indicators;
   integrating, by the processing device, the received one or more presence indicators;
   weighting, by the processing device, the integrated one or more presence indicators to determine whether to change the network behavior.

3. The method of claim 2, wherein receiving the one or more presence indicators includes receiving the one or more presence indicators from the first user.

4. The method of claim 2, wherein receiving the one or more presence indicators includes receiving the one or more presence indicators from an endpoint associated with the first user.

5. The method of claim 1, further comprising providing, by the processing device, the new user policy associated with the EPP.

6. The method of claim 1, further comprising providing, by the processing device, the EPP to network elements associated with an endpoint.

7. The method of claim 1, further comprising receiving, by the processing device, one or more presence indicators from a personal communications device that determines a location of the first user.

8. A computer readable medium including logic for changing network behavior according to presence information, the logic operable to perform the following steps:
   detect one or more presence indicators associated with a first user in a network, wherein the one or more presence indicators indicate presence information;
   form an electronic persistent presence (EPP) for the first user based on the one or more presence indicators;
   form an EPP for other users in the network based on the one or more presence indicators associated with the first user;
   determine whether to change the network behavior of any user in the network from a current user policy to a new user policy according to the EPP;
   initiate implementation of the new the second user policy associated with the EPP according to a determination that the network behavior is to be changed.

9. The computer readable medium of claim 8, the logic further operable to:
   receive the one or more presence indicators;
   integrate the received one or more presence indicators;
   weight the integrated one or more presence indicators to determine whether to change the network behavior.

10. The computer readable medium of claim 9, wherein receiving the one or more presence indicators includes receiving the one or more presence indicators from the first user.

11. The computer readable medium of claim 9, wherein receiving the one or more presence indicators includes receiving the one or more presence indicators from an endpoint associated with the first user.

12. The computer readable medium of claim 8, the logic further operable to retrieve the new user policy associated with the EPP.

13. The computer readable medium of claim 8, the logic further operable to provide the EPP to network elements associated with an endpoint.

14. The computer readable medium of claim 8, the logic further operable to receive one or more presence indicators from a personal communications device that determines a location of the first user.

15. A system for changing network behavior according to presence information, the system comprising:
- one or more endpoints operable to provide presence information to a network;
- an electronic persistent presence (EPP) engine operable to:
  - detect one or more presence indicators associated with a first user in a network, wherein the one or more presence indicators indicate the presence information of the first user;
  - form an electronic persistent presence (EPP) for the first user based on the one or more presence indicators;
  - form an EPP for other users in the network based on the one or more presence indicators associated with the first user;
  - determine whether to change the network behavior of any user in the network from a current user policy to a new user policy according to the EPP;
- a network element operable to implement the second user policy associated with the EPP according to a determination that the network behavior is to be changed.

16. The system of claim 15, wherein the EPP engine is operable to:
- receive the one or more presence indicators;
- integrate the received one or more presence indicators;
- weight the integrated one or more presence indicators to determine whether to change the network behavior.

17. The system of claim 16, wherein the EPP engine is operable to receive the one or more presence indicators from the first user.

18. The system of claim 16, wherein the EPP engine is operable to receive the one or more presence indicators from an endpoint associated with the first user.

19. The system of claim 15, further comprising a policy database coupled to the EPP engine operable to provide the new user policy associated with the EPP, wherein the EPP engine is operable to retrieve the new user policy associated with the EPP from the policy database.

20. The system of claim 15, wherein the EPP engine is operable to provide the EPP to network elements associated with an endpoint.

21. The system of claim 15, wherein the EPP engine is operable to receive one or more presence indicators from a personal communications device that determines a location of the first user.

22. A system for changing network behavior according to presence information, the system comprising:
- means for detecting one or more presence indicators associated with a first user in a network, wherein the one or more presence indicators indicate presence information;
- means for forming an electronic persistent presence (EPP) for the first user based on the one or more presence indicators;
- means for forming an EPP for other users in the network based on the one or more presence indicators associated with the first user;
- means for determining whether to change the network behavior of any user in the network from a current user policy to a new user policy according to the EPP;
- means for initiating implementation of the new user policy associated with the EPP according to a determination that the network behavior is to be changed,
- initiating implementation, by the processing device, of the new user policy associated with the EPP according to a determination that the network behavior is to be changed.

23. An apparatus for changing network behavior according to presence information, the system comprising:
- an electronic persistent presence (EPP) engine operable to:
  - detect one or more presence indicators associated with a first user in a network, wherein the one or more presence indicators indicate the presence information of the one or more endpoints;
  - form an electronic persistent presence (EPP) for the first user based on the one or more presence indicators;
  - form an EPP for other users in the network based on the one or more presence indicators associated with the first user;
  - determine whether to change the network behavior of any user in the network from a current user policy to a new user policy according to the EPP.

* * * * *

UNITED STATES PATENT AND TRADEMARK OFFICE
CERTIFICATE OF CORRECTION

PATENT NO. : 7,669,228 B2  Page 1 of 1
APPLICATION NO. : 11/319332
DATED : February 23, 2010
INVENTOR(S) : Moon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Seventh Day of December, 2010

David J. Kappos
*Director of the United States Patent and Trademark Office*